United States Patent
Seed et al.

(10) Patent No.: US 8,252,086 B2
(45) Date of Patent: Aug. 28, 2012

(54) EXTRACTION OF METALS FROM SULPHIDE MINERALS

(75) Inventors: Leonard Paul Seed, Guelph (CA); Gene Sidney Shelp, Guelph (CA)

(73) Assignee: Enpar Technologies Inc., Guelph, Ontario (CA)

( * ) Notice: Subject to any disclaimer, the term of this patent is extended or adjusted under 35 U.S.C. 154(b) by 719 days.

(21) Appl. No.: 12/440,085

(22) PCT Filed: Sep. 13, 2007

(86) PCT No.: PCT/CA2007/001593
§ 371 (c)(1),
(2), (4) Date: Mar. 5, 2009

(87) PCT Pub. No.: WO2008/031203
PCT Pub. Date: Mar. 20, 2008

(65) Prior Publication Data
US 2010/0011907 A1    Jan. 21, 2010

(30) Foreign Application Priority Data
Sep. 13, 2006   (GB) .................................. 0618025.1

(51) Int. Cl.
*C22B 3/04* (2006.01)
(52) U.S. Cl. ........................... 75/712; 423/658.5; 75/743
(58) Field of Classification Search ............... 423/658.5; 75/712, 743, 744
See application file for complete search history.

(56) References Cited

U.S. PATENT DOCUMENTS

| | | | |
|---|---|---|---|
| 3,595,096 | A | 7/1971 | Adler et al. |
| 3,957,601 | A | 5/1976 | Drinkard, Jr. et al. |
| 3,959,436 | A | 5/1976 | Watts |
| 3,979,256 | A | 9/1976 | Keefe |
| 4,024,218 | A | 5/1977 | McKay |
| 4,071,278 | A | 1/1978 | Carpenter et al. |
| RE30,005 | E | 5/1979 | Harvey et al. |
| 4,206,024 | A | 6/1980 | Carpenter et al. |

(Continued)

FOREIGN PATENT DOCUMENTS
RU    2062869    6/1996
(Continued)

OTHER PUBLICATIONS

Studies of pentlandite leaching in mixed oxygenated acidic chloride-sulfate solutions, Apr. 22, 1999.
(Continued)

*Primary Examiner* — Roy King
*Assistant Examiner* — Jared Wood
(74) *Attorney, Agent, or Firm* — Anthony Asquith Corp

(57) ABSTRACT

Nickel entrained in the sulphide mineral pyrrhotite is engineered to dissolve in leaching acid in a two step procedure. First, a slurry of the mineral and the acid is activated by oxidation. This is done in a time T1 by electrolysis; or alternatively chemically, by adding e.g an oxidizing acid to the mineral. After activation, the slurry is then kept under anoxic conditions for a time T2. During T2, the sulphide starts to dissolve much more rapidly, and the rapid breakdown of the sulphide enables the nickel to dissolve and thus to be leached out of the mineral. The dissolved nickel is extracted from the leaching acid e.g by electro-winning.

22 Claims, 2 Drawing Sheets

U.S. PATENT DOCUMENTS

| | | | |
|---|---|---|---|
| 2,272,341 | A | 6/1981 | Lamb |
| 4,342,952 | A | 8/1982 | Bowie |
| 4,343,773 | A | 8/1982 | Miller et al. |
| 4,571,262 | A | 2/1986 | Kerfoot et al. |
| 4,762,597 | A | 8/1988 | Scott |
| 5,569,370 | A | 10/1996 | Gomez |
| 5,882,502 | A | 3/1999 | Gomez |
| 6,896,808 | B1 | 5/2005 | Jay |

FOREIGN PATENT DOCUMENTS

| | | |
|---|---|---|
| WO | WO94/00608 | 1/1994 |

OTHER PUBLICATIONS

Semiconductor Electrochemistry of Particulate Pyrite, Feb. 2, 1997.
The Activox Process: Growing Significance in the Nickel Industry, Jul. 2005.
Electrogeneration of Hydroxyl Radicals on Boron-Doped Diamond Electrods, Jul. 20, 2002.
A review on pyrrhotite oxidation, Jul. 21, 2003.
A mechanism to explain sudden changes in rates and products for pyrrhotite dessolution in acid solution, Jan. 12, 2000.
Electrochemical oxidation of several chlorophenols on diamond electrodes: Part II. Influence of waste characteristics and operating conditions, Jan. 11, 2003.

EXTRACTION OF METALS FROM SULPHIDE MINERALS

This invention relates to the extraction, by leaching, of value-metals, such as nickel, that occur in trace concentrations in sulphide minerals, e.g iron sulphide minerals. The invention is described mainly in its relation to nickel; if other metals are present in the sulphide minerals, they too are likely to be leached out. Examples of other value-metals (besides nickel) that may be recoverable by the procedures as described herein include copper, gold, silver, lead, zinc, molybdenum, cobalt, bismuth, antimony, and platinum group elements.

INTRODUCTION

Traces of nickel are often present in large, easy-to-reach bodies of nickel sulphide and iron sulphide minerals—such as, for example, an existing body of iron sulphide tailings associated with mining (including nickel mining) operations. However, although the source material is readily available, extracting the nickel from that source material hitherto has proved uneconomical. Also, some easily-accessible but low-grade nickel ores exist, from which, again, it has been uneconomical to extract the nickel using traditional methods.

An aim of the invention is to make it economical to extract nickel, and other value-metals, that are present in sulphide minerals. It is recognized that the invention can be used in cases where the metals are present in small amounts in the sulphide minerals—e.g down to about 0.15% or so in the case of nickel, and 0.01% in the case of precious metals such as gold. Of course, other technologies can be economical for extracting nickel from sulphide ores when the nickel is present at about 4% or more, whereas the present technology can be economical at much lower concentrations, and furthermore is not so obtrusive environmentally. The minerals from which value-metals may be recoverable by the procedures described herein include pyrite, pentlandite, pyrrhotite, chalcopyrite, sphalerite, galena, some sulphosalts of the value-metals, and the like.

BACKGROUND TO THE INVENTION

Simple leaching, i.e immersing the source material in acid, does not serve to make the value-metal enter solution; or at least, not at a commercially practicable rate. When oxidation is attempted, passivating layers tend to form in sulphide minerals, which prevent or inhibit the metals present from dissolving.

SOME FEATURES OF THE INVENTION

The scope of patent protection sought herein is defined by the accompanying claims.

It is recognized that it is possible to increase the rates at which dissolution of the sulphide minerals can be procured, by avoiding or by-passing the problem of passivation of the mineral.

It is recognized that the iron sulphide mineral pyrrhotite is a mineral that can be engineered to dissolve at a rapid rate, under certain circumstances, by following a particular procedure. The procedure, basically, is as follows:
  immerse the iron sulphide mineral in acid (at pH=2, for example) thereby forming a slurry;
  supply oxidative energy to the slurry, to activate (partially oxidize) the mineral;
  stop supplying oxidative energy to the slurry, after a period of time T1;
  allow the slurry to stand for a time T2, under anoxic conditions.

What happens is that, upon being activated, the sulphide mineral goes through a number of phases:
  When activation first starts, there is an immediate, but short-lived, surge of dissolution of exposed Fe, of oxy-sulphur, of hydroxide/oxyhydroxide, etc.
  Then, in an induction phase, the input of activation energy is continued. Iron from the sulphide goes into solution, and sulphur species become formed or deposited on the particles of the mineral.
  The induction phase ends when sulphide mineral is fully, or almost fully, activated, and the input of oxidative energy is discontinued.
  Now, the slurry is left to stand, under anoxic conditions. Thus starts the phase of rapid reductive dissolution. The rate at which the sulphide mineral now dissolves is several orders of magnitude faster than during the induction phase.
  Finally, the rate of dissolution slows. At this stage, typically, more than 85% of the sulphide mineral has broken down. The iron therefrom is present as dissolved Fe++, and some of the sulphur is present as dissolved sulphur species or as elemental sulphur. Much of the sulphur has been discharged from the slurry in the form of hydrogen sulphide gas.

These phases are now considered in more detail. During the induction phase, unstable or meta-stable poly-sulphides deposit onto the as-yet undissolved sulphide particles. Also at this time, the iron undergoes oxidative dissolution—but only slowly, as it diffuses through the sulphur-rich layers.

It is recognized that, if the input of oxidative energy were to be continued for a long period, what would or might happen, especially with respect to the mineral pyrrhotite, is that the unstable poly-sulphide species would give way to stable elemental sulphur and oxy-sulphur species, which would or might form layers around the undissolved particles of sulphide mineral. It is recognized that these stable layers, if allowed to form, would to a large extent passivate the remaining mineral, and greatly inhibit further dissolution. Therefore, the oxidative energy input should be curtailed, and preferably should cease, before the unstable or metastable poly-sulphides are overtaken by the stable sulphur species.

When the input of oxidative conditions is discontinued, that is the end of the induction phase, and the phase of rapid dissolution now commences. Now, the unstable poly-sulphide species undergo reductive reactions, and this triggers the very vigorous dissolution.

As to the reason for the rapid dissolution, it may be hypothesized that, during the induction phase, electrons became trapped in the meta-stable states, in the surface regions of the sulphide crystals. The suggestion is that, when the negative charge has accumulated to a level capable of reducing covalent S—S bonds, now the electrons are available to be discharged, sufficiently to reduce the poly-sulphide species, and the rapid phase commences. This rapid phase could notionally continue until all the sulphide mineral is broken down. However, towards the latter stages, the passivating layers start to predominate, and further dissolution is inhibited; though, at least in the case of pyrrhotite, when this happens, typically some 98% of the sulphide has already been broken down.

Thus, following the rapid dissolution phase, in that case 98% of the Fe from the sulphide now resides in solution, in the acid. Some of the S resides in solution as soluble sulphur species, but much of the S has bubbled off as H2S gas.

The effects of the above chemical process on the nickel residing in the minerals will now be considered.

Nickel, when present in iron sulphide minerals, is often associated with the sulphide minerals pyrrhotite and pentlandite. Nickel in pyrrhotite can be present as a solid solution, and/or in the form of small pentlandite intergrowths in the pyrrhotite sulphide. It is considered unlikely that pentlandite has the property, as does pyrrhotite, that it can be engineered to undergo the rapid dissolution phase.

Although, probably, the pentlandite, by itself, cannot (economically) be made to undergo the rapid dissolution phase, it may be hypothesized that, when the pentlandite lies in close proximity to pyrrhotite, and when the pyrrhotite has been engineered to undergo the rapid dissolution phase, as described herein, the pentlandite also can be made to release its metals into solution. In many tailings beds, the particles of pentlandite are indeed physically close to the pyrrhotite, or the particles of pentlandite are (loosely) chemically bonded into the pyrrhotite. Any nickel in the form of a solid solution within the pyrrhotite can be expected to be released upon breakdown of the pyrrhotite.

Nickel is not itself a chemical constituent of pure pyrrhotite. Not all pyrrhotite has the same iron content, but rather the iron content varies from FeS (i.e Fe=1) to Fe=0.8. In an oxidative environment, the FeS breaks down, when oxidized, to $Fe^{+++}SO_4^{--}$. Pyrrhotite at the lower Fe inclusions oxidizes to $0.8Fe^{+++}SO_4^{--}+1.6H^+$.

Pentlandite does include nickel, being $Fe_{4.5}Ni_{4.5}S_8$ or generally $(Fe,Ni)_9S_8$. In minerals from which nickel is commercially extracted, the pentlandite tends to be the predominant sulphide present, as deposits of pentlandite, although pyrrhotite is always also present. But in tailings bodies that contain traces of nickel of the kind with which the invention is concerned, generally the nickel is present in the pyrrhotite, with some pentlandite present as small pockets which are entrained in pyrrhotite. (Of course, other sulphide minerals are also likely to be present, such as pyrite itself $FeS_2$.)

Again, it is the mineral pyrrhotite that can be engineered to undergo the rapid dissolution phase. (This is not to say that it would be impossible to engineer the rapid dissolution phase economically with any other mineral, however.) Although pentlandite is generally accompanied by pyrrhotite, the present invention should be regarded as being especially beneficial when applied to tailings that have comparatively small pockets of pentlandite in an overall matrix of pyrrhotite, i.e in which the nickel in the pentlandite is in physically close proximity to the rapidly-dissolving pyrrhotite.

Thus, although nickel resides in pentlandite, tailings bodies in which pyrrhotite does not preponderate over the pentlandite might not be good candidates for recovery of the traces of nickel by the procedures described herein for engineering the rapid dissolution phase. Cases where most of the recoverable nickel is present actually within the pyrrhotite crystals, of course would be expected to be very good cases for extraction of the nickel by the procedures described herein.

It is recognized that, when the procedures as described herein are carried out, on suitable tailings, as much as 70% or more of the nickel in the tailings can be leached into the acid. Considering the billions of existing tonnes of tailings containing around 1% of nickel, the 70% does represent many millions of tonnes of very easily accessible nickel.

Once the nickel has leached into the acid—along with the many Fe and S species that also go into solution, of course—now the conventional ways of winning the nickel from the acid may be deployed.

The procedures described herein for tailings containing nickel may be applied also to low grade nickel ores, or concentrates from nickel ores. The procedures may be applicable also to other metal sulphide tailings and their respective low grade ores or concentrates. It is recognized that the extraction of value-metals, by the procedures as described herein, is especially suitable for the extraction of nickel from pre-existing sulphide-tailings beds.

PREFERRED EMBODIMENTS

The technology will now be further described with reference to the accompanying drawings, in which.

It is recognized that what is required, in order for it to be possible to leach the nickel out of iron sulphide (pyrrhotite) tailings, is for the procedures as described herein to be put in place, that will create the rapid breakdown of pyrrhotite. It has been recognized that, as the pyrrhotite mineral dissolves, the (physically or chemically) entrained nickel, too, will be released, and will enter into solution in the leaching acid.

When designing a system for leaching nickel from a slurry of the sulphide minerals in acid, the designer should set up the procedure of first activating the mineral for a time period T1. This is done by creating an oxidizing environment, for example by arranging the sulphide mineral as the electrolyte of an electrolytic cell, e.g in the manner discussed below. After the time T1, the energy input is discontinued, and the designer now provides that the slurry be allowed to stand, for a further time period T2, in an anoxic state. After that, the nickel has now dissolved in the acid, whence it can be removed by traditional technologies.

This procedure, if done properly, creates the rapid dissolution phase in respect of the pyrrhotite. It is recognized that, during this rapid dissolution phase (T2), the nickel also is released, and the nickel also enters solution in the acid.

Done electrolytically, the initial or induction phase involves activation (by input of electrical energy) of a slurry comprising a mass of source material, in this case sulphide tailings, in hydrochloric acid. Enough acid is included in the slurry that the slurry has a pH of about two, or less. Enough (liquid) acid is included also that the physical consistency and coherence of the slurry are such as to render the slurry stirrable. This occurs at a lower solid/liquid ratio (w/w) than about 1/1. The mineral preferably should be in the form of predominantly small particles, having a grain size less than 250 microns.

It might be expected that sulphide particles larger than this would not undergo, or would not completely undergo, the rapid dissolution phase as described herein, within anything like a reasonable time frame. (A reasonable time frame would see all the nickel that can dissolve dissolved within about one hour, and certainly less than about half a day, from the start of the rapid dissolution phase.

Figure 1:
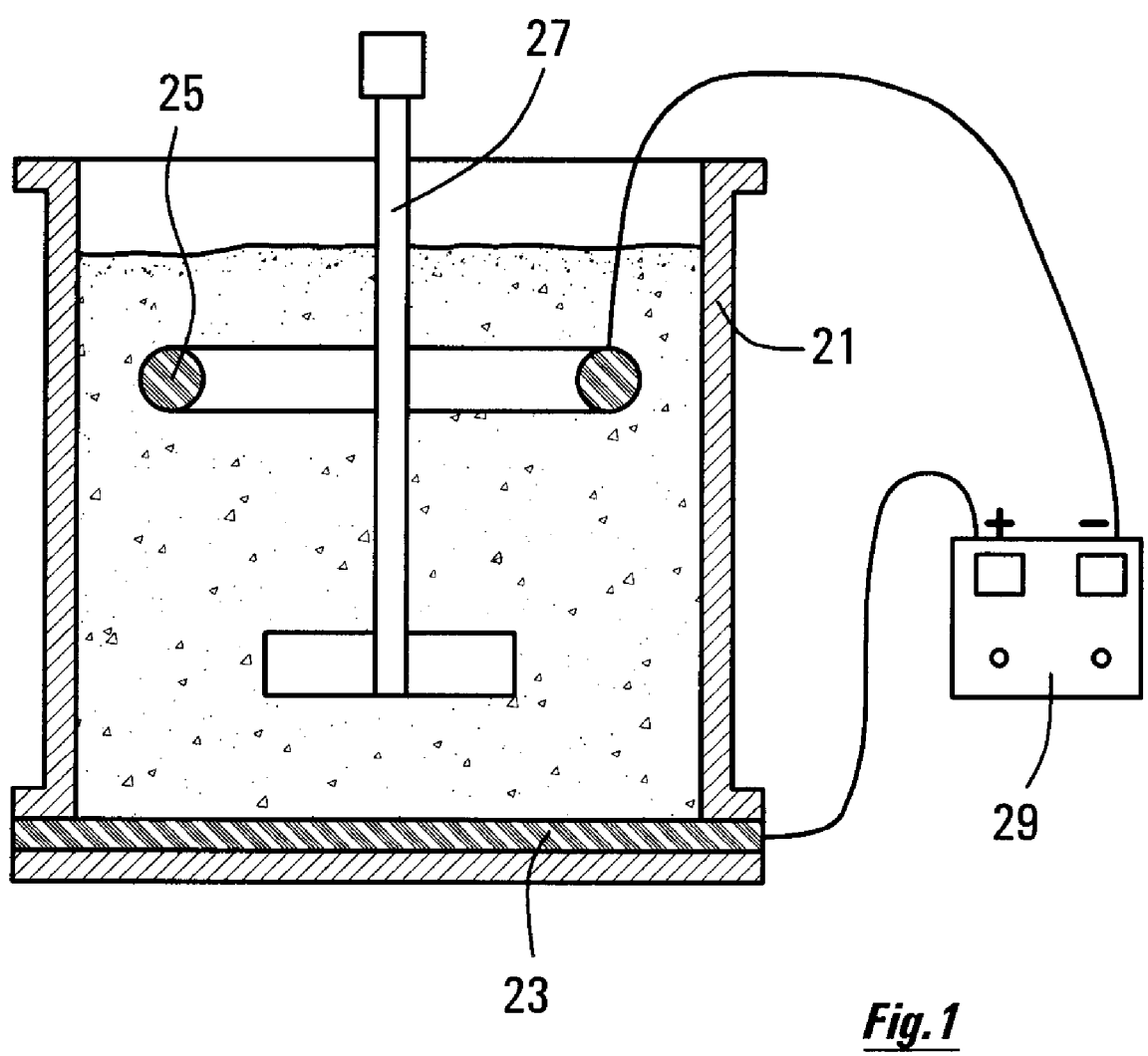
FIG. 1 is a diagram showing some items of equipment arranged for promoting some of the reactions as described herein.

In FIG. 1, the slurry has been placed in a reactor or containment vessel 21, in which the activation is done by electrolysis. The floor of the reactor 21 includes an anode plate 23, and a cathode is provided in the form of a suspended ring 25. These components are arranged such that, during operation, the cathode 25 is submerged within the slurry. A motorized stirrer 27 aims to eliminate differences and gradients of concentration throughout the body of slurry—which maximizes the differences and gradients at the electrodes. Current is fed to the electrodes from a DC power source 29.

The input of electrochemical energy is aimed at partially oxidizing the sulphide minerals, and thus promoting the formation of meta-stable poly-sulphide species—in effect, activating the mineral. A relatively low current density is preferred, i.e preferably less than about a hundred amps per square meter of conducting electrode, in order to promote the desired oxidation reactions but yet to avoid e.g deposition of metals on the cathode, and avoid re-formation of a secondary sulphide mineral.

Once the input of energy has been discontinued, i.e after time T1 (the induction phase), and during time T2 (the rapid dissolution phase), the slurry should not be exposed to air or other oxidizing agents. Oxidation, if it occurred now, might transform the meta-stable poly-sulphides into stable sulphur, which, as explained, might passivate the as-yet undissolved mineral, and inhibit the reduction reactions that promote the rapid dissolution process.

Thus, the activated slurry should be kept under anoxic conditions during the period of rapid dissolution, T2. One step that can be taken to promote the realization of anoxic conditions is to keep the slurry, for the time T2 of the rapid dissolution phase, in the same vessel that it occupied during the time T1 of the induction or activation phase. It would be all too easy for some oxidation to occur if the slurry were to be transferred from one vessel to another. However, designers might prefer to specify such a transference for production reasons.

Some slight over-oxidation, after the activation, might be tolerated, but what happens then is that the rapid dissolution phase can be delayed. The reduction reactions that lead to the rapid dissolution cannot start until such further oxidation has been reduced. The less the amount of over-oxidized elemental sulphur, the shorter the waiting time that must elapse before the rapid dissolution phase can get under way. As discussed, too much oxidation of the sulphide leaves too much of the resulting sulphur in elemental form, which passivates the remaining sulphide mineral and inhibits the rapid dissolution phase from occurring at all.

In FIG. 1, the anode plate is of titanium or niobium, coated with boron-doped diamond (BDD). The BDD material is very stable, and is characterized by a high overpotential, 2.2 volts (SHE), for oxygen evolution. It is recognized that the BDD material can be very effective in oxidation applications. BDD is preferred, but other materials may be used in the anode, if they have a high oxygen overpotential (greater than 1.8 volts SHE).

At least in the case of activation by electrolysis, the amount of energy input required for the activation step may be estimated (from published data) at from about twenty kilo-Joules per mole of the sulphide mineral to about one hundred kJ/mole. It will be understood that this range is not expressed as a margin of variation; rather, the different energy requirements go with the different minerals, minerologies, densities, etc, as encountered in different source-materials. Every batch of sulphide mineral from the same tailings source, for example, would be expected to have the same energy requirements, within a small margin.

Figure 2:
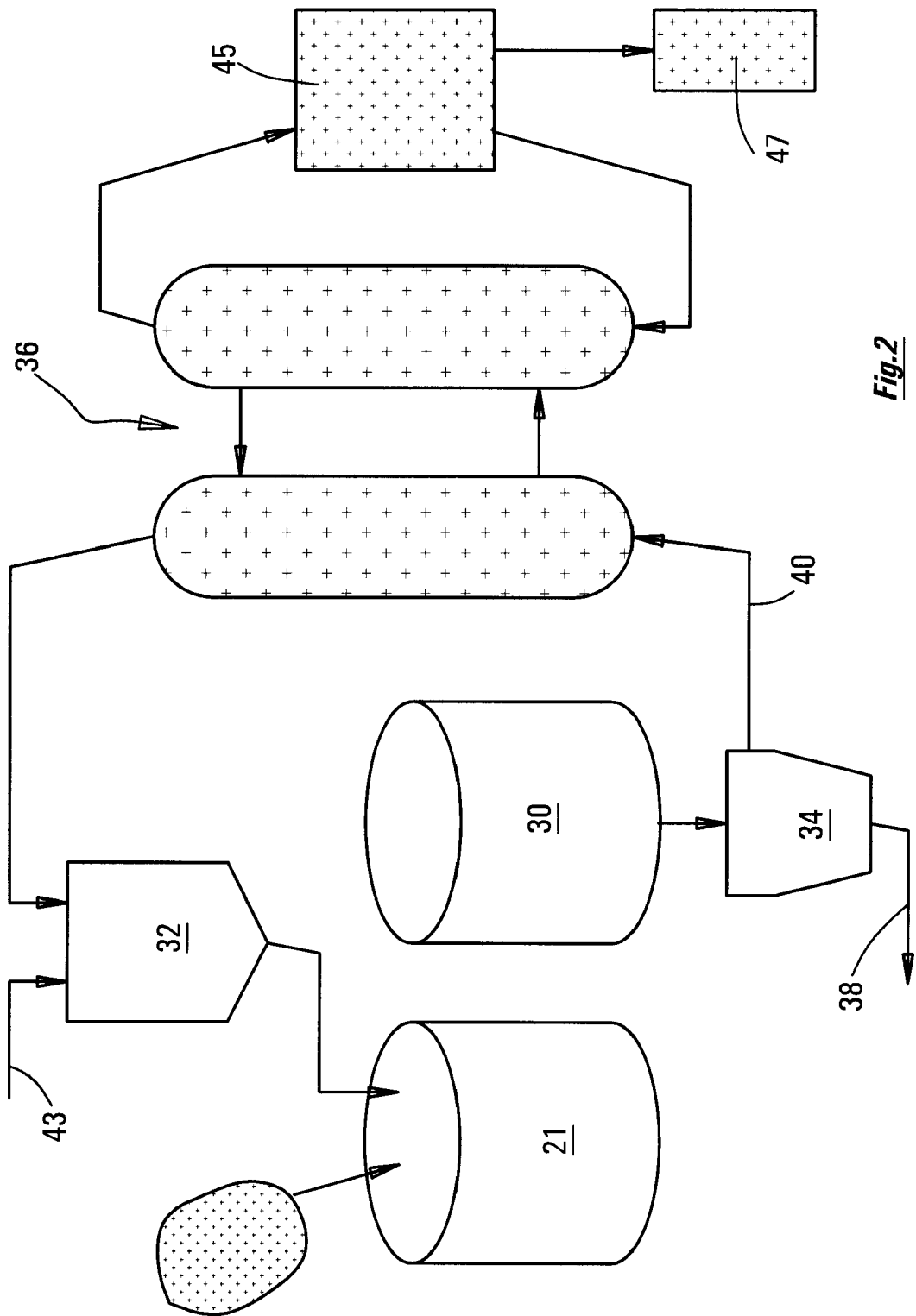
FIG. 2 is a diagram showing the equipment of FIG. 1 incorporated into an overall circuit.

An example of a typical overall hydrometallurgical circuit is shown in FIG. 2. Tailings source material 30 is fed into the electrolysis vessel 21. Hydrochloric acid is also fed into the vessel 21 from an acid reservoir 32. In the FIG. 2 arrangement, the slurry, having been activated in the vessel 21, is transferred to an anoxic vessel 30, where it is covered and remains under anoxic conditions during the rapid dissolution phase.

As an alternative to the activation by electrolysis, the oxidative activation of the sulphide mineral can be done chemically, as will now be described.

Now, the sulphide mineral is placed in the activation-vessel 21, along with enough water to make a slurry that can readily be stirred by the stirrer 27. Once the slurry has been mixed thoroughly by the stirrer, now a suitable acid is injected into the slurry.

Suitable oxidizing acids include sulphuric acid, perchloric acid, etc. Hydrochloric acid is a reducing acid; however, HCl can be used with iron sulphide minerals (particularly weathered tailings), because it forms ferric chloride, which is a strong oxidant.

The acid, highly concentrated, is injected under pressure, i.e rapidly, into the slurry in the activation vessel. Injecting the acid thus into the watery slurry induces an exothermic effect, and the heat produced is utilized to heat the slurry and the acid. For effective activation, the slurry should be raised to a temperature of at least about 40° C. in the case of HCl acid, and at least about 50° C. for the oxidizing acids. The technicians should see to it that the temperature does not approach the boiling point of any of the liquid components of the slurry, as that would or might disrupt the process.

In many cases, the heat produced by the injection of the acid is enough to sustain and complete the activation process. However, the prudent designer specifies also a facility for heating the activation-vessel, in case a supplementary input of heat might be needed.

With the chemical oxidation, as with electrolytic oxidation, the same vessel can be used for the anoxic rapid dissolution phase as the vessel 21 that was used for the induction or activation phase, or a separate anoxic vessel 30 may be used.

After the activation period T1 and the rapid dissolution period T2, now the treated slurry passes out of the anoxic vessel 30, via a solids/liquid separator 34, from which the liquid passes to an extraction station 36, and from which such undissolved solids as remain are conveyed for disposal, at 38. Not shown in FIG. 2 is the station for collecting the hydrogen sulphide gas that is produced in the anoxic reactor.

The extraction station 36 may be of conventional design. The liquid acid, containing the dissolved metals, enters at 40. The liquid acid, now with the dissolved metals removed, passes to the acid reservoir 32, for re-use in the process. New make-up acid, as needed, is added at 43. The extraction station 36 includes an electro-winning station 45, in which the dissolved solids are caused to precipitate. Solid metal is collected in a repository 47.

In a laboratory test, a mass of tailings, comprising mainly pyrrhotite, from a mine near Sudbury, Canada, was placed in an electrolysis vessel. Enough hydrochloric acid liquid was added to the vessel such that the pH of the resulting slurry was less than two. The ratio of the mass of tailings to the mass of liquid was 1:5.6. The tailings used in the test contained 0.8% nickel (by dry weight).

Electrical energy was switched on, and applied across the electrodes, to activate the slurry. After a time T1 of five hours, the current was switched off, and the slurry was left under anoxic conditions.

The nickel concentration in the liquid acid leachate was tested at the end of the induction period, i.e before commencement of the rapid dissolution phase, and was found to be 143 milligrams per litre. The nickel concentration in the liquid acid leachate was again tested three hours later, after emission of H2S gas had ended, i.e at the end of the rapid dissolution phase, and the nickel concentration was now found to be 1160 milligrams per litre. Power consumption during the electrolysis amounted to five kilowatt-hours per kilogram of nickel recovered. Approximately 77% of the nickel was recovered.

As mentioned, the time period T1 starts when oxidative energy is applied to the cell. The time period T1 ends when an amount of energy has been supplied such that the meta-stable poly-sulphides are at a maximum, and the change to the stable elemental sulphur is not yet commenced significantly. This change from unstable sulphide to stable sulphur can be detected by monitoring the rate at which Fe enters solution in the acid. When the rate of Fe dissolution starts to drop, that is an indication that the stable sulphur species are starting to form, and to replace the unstable poly-sulphides.

Preferably, therefore, a record should be kept of the time T1, in respect of a few treatment batches. It can then be determined whether the time T1 is constant, batch to batch (which it should be if the parameters of the electrolysis of the slurry in the reactor are constant). Then, the process controls can be adjusted such that the energy supply is switched off (in the electrolysis case) just before the onset of the stable mono-sulphides.

In the case where the activation is being done by chemical oxidants, if heat is being added by e.g an electric heater, that heater can be switched off, which is a controllable way of ending the activation process. But if the oxidative energy is introduced into the slurry by way of an initial addition of chemicals to the slurry, the energy cannot now be switched off, and in that case the amount of energy is controlled by controlling the amount of energy initially added. In that case, it would probably be prudent to carry out preliminary tests to determine just what is the appropriate amount of oxidant material to be added, that will ensure complete (or practically complete) activation on the one hand, but yet no (or practically no) over-oxidation on the other hand.

Alternatively, the designer might decide to set the timing simply by trial and error. However, the change in Fe dissolution rate is easy enough to monitor, and it does serve to indicate when the end T1, i.e when to switch off the current in the electrolysis station.

Some further aspects of controlling the induction or activation phase T1 (prior to the rapid dissolution phase T2), will now be described The designer wishes to be sure that enough oxidative energy is supplied to the slurry that the mineral is fully activated, before switching off or discontinuing the oxidation energy. On the other hand, the designer also wishes to ensure that the mineral has not been over-oxidized, as that could lead to the formation of the stable sulphur species, which might passivate the mineral.

It is recognized, in the invention, that there is likely to be ample margin between these two occurrences, at least in the usual situations likely to be encountered commercially. Thus, if, in a particular case, the amount of oxidation energy needed to completely activate the mineral were e.g a hundred units, and if the amount of oxidation energy that might lead to over-oxidization were two hundred units, that two-to-one ratio would be regarded as an adequate margin.

An adequate margin is one that will allow the amount of oxidation energy that is applied to the slurry during the induction phase to be controlled accurately enough for efficient operation of the oxidation process, without the need to resort to delicate (and expensive) fine process controls. It is recognized that the margin between complete oxidation and over-oxidization will, in many cases, be even larger than the two-to-one margin mentioned.

That being so, the designer can provide that the length of the T1 process time can be set by simple trial and error. If it is desired to monitor the process more accurately, the redox or Eh-voltage of the slurry can be monitored. An Eh-voltage (SHE) reading of about 200 millivolts indicates that oxidation is substantially complete.

The Eh-voltage measurements can also be used to indicate especially the start of T2 (the rapid dissolution phase), in that the Eh-voltage will then be observed to drop sharply. However, the Eh-voltage does not provide such a good indication of the end of the rapid dissolution, in that there is no sudden change in measured voltage at that point. Again, monitoring hydrogen sulphide provides a strong signal of the end of rapid dissolution, in that the emission of H2S then stops.

The lengths of the time periods T1 and T2 vary, depending on mineralogy, acid strength, temperature, densities, and other factors. It is not likely that either period will take longer than about six hours, nor less than about half an hour.

During activation, the sulphide predominantly breaks down as follows: iron goes into solution in the acid, whereas sulphur forms or is deposited as the unstable polysulphide species. That this is happening can be detected by monitoring the rate at which iron and sulphur are entering solution: if the iron is dissolving faster, that means activation is taking place.

When activation is complete, now the dissolution rate of the iron starts to fall, and also the rates become more nearly equal. Thus, the end of activation can be detected by monitoring the dissolution rates: if the dissolution rate of iron is faster than that of sulphur, activation is still going on (i.e the sulphur is still being deposited); if the dissolution rate of iron falls significantly, and/or if the rates become more nearly equal, further oxidation will not now create more unstable sulphur species, i.e activation is now complete.

In the over-oxidation state, the sulphur has now started to form the stable species. One way of detecting this, i.e of detecting over-oxidation, is to monitor the slurry for the presence of sulphate: if the dissolved sulphate content starts to rise, that is an indication that the unstable species are starting to break down.

As to controlling the timing of the period T2, the designer preferably should arrange for the emission of H2S from the slurry to be monitored. Hydrogen sulphide gas, of course, is all too easy to detect. The start of H2S emissions signals the start of the rapid dissolution phase, and the start of the period T2. The end of H2S emissions signals that the process of rapid dissolution, and time T2, has now finished.

Although it is very simple to detect hydrogen sulphide emission, monitoring the rapid dissolution phase can be done in other ways. For example, the nickel concentration in the acid can be measured periodically, which will enable a determination to be made as to when the rapid dissolution starts and ends. Also, measuring the redox voltage, i.e the Eh voltage using a standard hydrogen electrode, can serve to indicate the progress of the oxidation phase and the reducing, rapid dissolution, phase.

Once the rapid dissolution phase is ended, now it remains to extract the dissolved nickel from the acid. The acid contains dissolved iron along with the dissolved nickel. A typical ratio might be a hundred parts dissolved iron to one part dissolved nickel. Traditional techniques such as electro-winning can be used for extracting the value-metal from the acid. To do this, the acid is separated from the remaining undissolved solids, which can be discarded. Then, the acid liquid (containing the dissolved metals) is transferred to the electro-winning station, preferably via a separation station, in which some or most of the dissolved iron is separated out before extracting the nickel. An additional step of solvent extraction might be required, in order to increase the nickel concentration. Much of the liquid acid should be recoverable, and used again in another batch of sulphide-acid slurry.

To repeat: it is not suggested that pyrrhotite is the only mineral that can be engineered to undergo the rapid dissolution phase, as described. It may be that other minerals can be engineered to do the same—though, it might be suspected, on a less commercially-attractive scale than pyrrhotite. At any rate, it is recognized that pyrrhotite is a common, if not universal, constituent of sulphide tailings that contain nickel, and it is probable that the resources needed to make pyrrhotite undergo the rapid dissolution phase are considerably less than the resources needed to do the same with other sulphide minerals.

The technology described herein leaves a body of tailings in an already activated condition. This is a benign condition, which can make the body of tailings less dangerous. Regular tailings, if permitted to oxidize, can create AMD (acid mine drainage), which is a large pollution problem. The fact that the tailings have already been partially oxidized—by the reactions as described herein—makes the tailings now far less dangerous and less likely to produce AMD, even if the tailings were to be completely abandoned. The enormous (traditional) cost of ensuring permanent non-oxidizability of a body of sulphide tailings (which will have to be borne in any event in many jurisdictions) may be compared with the cost of extracting nickel from the body of tailings by the procedures described herein, offset by the value of the extracted nickel. It will be observed that the tailings have been rendered (almost) completely safe, for nothing.

As mentioned, during the rapid dissolution phase, much of the sulphur in the sulphide mineral is transformed into hydrogen sulphide gas. The H2S can serve as a simple raw material for making sulphuric acid, and such on-site-manufactured acid might be used as the acid in the slurry. If sulphuric acid is found to be not so suitable as e.g hydrochloric acid, but if the sulphuric can be manufactured from the H2S (which has to be collected and disposed of, in any event), it is likely to be much more economical.

Hydrochloric acid is a suitable acid, in this application, because of the ability of Cl− ions to act as a ligand for many metal species. Also, Cl− has an ability to attack passive layers that can form on the mineral during electrochemical oxidation.

This invention relates to the extraction, by leaching, of value-metals such as nickel that occur in low concentrations in sulphide minerals. The invention has been described mainly in its relation to nickel, occurring in nickel sulphide and iron sulphide minerals, but the invention can be applied to copper, gold, lead zinc, and other metals in their respective sulphide mineral form. Whatever other metals are present in the sulphide minerals, they too are likely to be leached out. As mentioned, the mineral pyrrhotite is known to be capable of being engineered economically to undergo the rapid dissolution phase. It is not ruled out that other minerals might turn out to have the same capability, especially as economic conditions change.

It is also not ruled out that the method of extracting value-metals from sulphide minerals as described herein can be an economical alternative to smelting, for regular higher grade ores, not least because of the reduced environmental impact of the present methods.

Different embodiments of the invention have been described herein as having different particular features. It should be understood that the features of one embodiment can be added to, or substituted in, the other embodiments unless otherwise stated, or unless it is clear contextually that such substitution or addition would be physically or chemically inappropriate.

The numerals that appear in the drawings may be collated as:
21 contaminant/electrolysis vessel
23 anode plate on floor of 21
25 suspended cathode
27 motorized stirrer
29 DC power source
30 anoxic vessel
32 acid reservoir
34 solids/liquids separator
36 extraction station
38 disposal of undissolved solids
40 conveyance of liquid acid containing dissolved metals
43 make-up acid
45 electro-winning station
47 repository for collected metals

The invention claimed is:

1. Procedure for extracting a value-metal, such as nickel, from a source material such as low grade ore or mine tailings; the procedure is characterised by including:
   providing a mass of the source material;
   a major part of the source material being sulphide minerals;
   providing a volume of liquid acid, and forming a slurry comprising the volume of acid and the mass of source material;
   containing the slurry in an activation-vessel;
   applying oxidative energy to the slurry, for a time period T1, in such manner as to procure oxidation of the minerals;
   applying the oxidation energy to the slurry at such a rate, and for such a time period T1, as to activate the sulphide minerals completely or nearly completely;
   whereby, during T1, the sulphide minerals dissolve in the liquid acid at a slow rate;
   then containing the activated slurry in an anoxic-vessel, under anoxic conditions, for a time period T2;
   the time period T2 is such that, during T2, the sulphide minerals dissolve at a high rate, which then starts to fall significantly;
   the relatively slow rate being slower than the high rate;
   whereby, during T2, the value-metal in the slurry undergoes a rapid dissolution phase; and then
   recovering the dissolved value-metal from the acid liquid.

2. The procedure of claim 1, wherein the source material comprises tailings from a mine operation, and the iron sulphide minerals in the mass include pyrrhotite.

3. The procedure of claim 2, wherein the value-metal is nickel, and at least some of the value-metal is present in the pyrrhotite in solid solution, or in the form of small intergrowths of pentlandite in the pyrrhotite, or both.

4. The procedure of claim 1, including ensuring that:
   the slurry in the activation-vessel is at a pH level of about two or less; and
   the slurry is of such consistency and coherence that the slurry is stirrable.

5. The procedure of claim 1, wherein the acid is hydrochloric acid.

6. The procedure of claim 1, wherein the acid is sulphuric acid, and the procedure includes collecting hydrogen sulphide gas from the slurry, and using the collected gas as a raw material in the manufacture of sulphuric acid, and adding the manufactured sulphuric acid to the slurry.

7. The procedure of claim 1, wherein the activation-vessel and the anoxic-vessel are two separate vessels, and the slurry is transferred from the activation-vessel to the anoxic-vessel, between the end of T1 and the start of T2.

8. The procedure of claim 1, including:
monitoring Eh-voltage in the activation vessel; and
checking that the activation of the slurry is under way, by checking that the Eh-voltage has risen above about 200 millivolts (SHE).

9. The procedure of claim 1, including:
applying the oxidation energy to the slurry at such a rate, and for such a time period T1, as to avoid over-oxidation;
where over-oxidation is marked by the formation or deposition of stable sulphur species on or in the minerals.

10. The procedure of claim 1, including supplying the oxidative energy for activation by electrolysis, by:
providing an anode and a cathode in the activation-vessel, and thereby creating an electrolytic cell in the activation-vessel, of which the slurry is the electrolyte; and
passing electrical current between the electrodes, for the time period T1, thereby partially oxidising the minerals in the slurry.

11. The procedure of claim 10, wherein the anode of the electrolytic cell is coated with boron-doped diamond.

12. The procedure of claim 10, including:
monitoring the rate at which metal in the slurry dissolves, during the time T1;
in response to detecting that the rate at which the metal dissolves has dropped significantly, ending the time period T1 by ceasing to apply energy to the cell.

13. The procedure of claim 1, including supplying oxidative energy, to activate the slurry, in the form of chemical oxidants, and by heating the slurry to a temperature of at least 40° C.

14. The procedure of claim 13, including supplying oxidative energy, to activate the slurry, by forming oxidants in-situ, in the slurry, through the addition of acid to the slurry.

15. The procedure of claim 13, including:
placing the mass of source material in the activation-vessel, together with sufficient water to make a watery-slurry of the minerals and the water that can be stirred; and
adding the acid to the watery-slurry so rapidly that at least a major part of the heat required to bring the slurry to a temperature of at least 40° C. is created by the rapid addition of the acid to the watery-slurry.

16. The procedure of claim 13, including:
where the oxidative energy for activation is supplied to the slurry by way of ongoing addition of an oxidant chemical;
monitoring the rate at which metal in the slurry dissolves, during the time T1;
in response to detecting that the rate at which the metal dissolves has dropped significantly, ending the time period T1 by ceasing to add the oxidant chemical.

17. The procedure of claim 1, including detecting completion of activation, and the end of time period T1, by:
monitoring the rate at which iron enters solution;
marking the completion of activation by noting when the rate at which iron enters solution significantly falls;
applying enough oxidative energy to ensure complete activation of the slurry.

18. The procedure of claim 1, including:
monitoring the presence of sulphate in the acid;
marking a point of over-oxidation as the point, after activation is complete, at which the sulphate content of the acid starts to rise;
applying enough oxidative energy for complete activation of the slurry, but not so much oxidative energy as to over-oxidise the slurry.

19. The procedure of claim 1, wherein:
during time T2, as the sulphide dissolves, hydrogen sulphide gas is emitted from the slurry;
monitoring the slurry for the emission of hydrogen sulphide gas; and
marking the end of the time period T2 in response to a significant fall in the rate of emission of hydrogen sulphide gas.

20. The procedure of claim 1, including marking the commencement of the time period T2 responsively to a significant rise in the rate of emission of hydrogen sulphide gas.

21. The procedure of claim 1, including marking the commencement of the time period T2 in response to a significant fall in the Eh voltage of the slurry.

22. The procedure of claim 1, wherein:
activation is marked by the formation, on or in the minerals, of unstable or meta-stable poly-sulphide species; and
activation is complete when the addition of further oxidative energy substantially fails to further increase the formation of the unstable or meta-stable poly-sulphide species.

* * * * *